(12) United States Patent
Ossenkopp et al.

(10) Patent No.: US 8,823,239 B2
(45) Date of Patent: Sep. 2, 2014

(54) ELECTRICAL MACHINE

(75) Inventors: Stefan Ossenkopp, Harsum (DE); Joachim Becker, Hohenhameln (DE); Holger Klatte, Hildesheim (DE); Erik Maurer, Buehlertal (DE); Ngoc-Thach Nguyen, Grossbottwar (DE); Stefan Stoermer, Sarstedt (DE); Bruno Holzwarth, Schwieberdingen (DE); Tilo Koenig, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 1269 days.

(21) Appl. No.: 12/525,413

(22) PCT Filed: Jan. 24, 2008

(86) PCT No.: PCT/EP2008/050783
§ 371 (c)(1),
(2), (4) Date: Mar. 17, 2010

(87) PCT Pub. No.: WO2008/092789
PCT Pub. Date: Aug. 7, 2008

(65) Prior Publication Data
US 2010/0187944 A1 Jul. 29, 2010

(30) Foreign Application Priority Data

Feb. 1, 2007 (DE) .......................... 10 2007 005 031
Jun. 27, 2007 (DE) .......................... 10 2007 029 710
Jan. 17, 2008 (DE) .......................... 10 2008 004 876

(51) Int. Cl.
*H02K 1/28* (2006.01)
*H02K 1/18* (2006.01)

(52) U.S. Cl.
CPC . *H02K 1/185* (2013.01); *H02K 1/28* (2013.01)

USPC .......................... 310/216.049; 310/216.004

(58) Field of Classification Search
USPC .................................. 310/216.049, 216.004, 310/216.001–216.136
See application file for complete search history.

(56) References Cited

FOREIGN PATENT DOCUMENTS

DE 36 15 230 11/1987
DE 195 23 789 1/1997

(Continued)

OTHER PUBLICATIONS

JP2006217770 A machine translation Feb. 22, 2013.*

*Primary Examiner* — Tran Nguyen
*Assistant Examiner* — Leda Pham
(74) *Attorney, Agent, or Firm* — Michael Best & Friedrich LLP

(57) ABSTRACT

The invention relates to an electrical machine (8), in particular an electric motor, suitable for the adjustment by external force of elements of a motor vehicle, essentially for driving a steering booster. The inventive electrical machine comprises a rotor (7) and a shaft (10), the rotor having a plurality of plates (5), wherein the plates (5) are premounted on the shaft either individually or as a plate assembly (6) or by means of a plurality of plate assemblies (6), the rotor (7) being connected to the shaft (10). The plates (5) have resilient lugs (3) for fixing the plates (5) and/or plate assemblies (6) to the shaft (10). Furthermore, the plates (5) of the plate assemblies (6) comprise centering lugs (1) which serve to radially center the plate assembly (6) relative to the shaft (10). An attachment of the stator (15) in a housing part (16) is possible, wherein centering lugs (1) at the plates (5) of the plate assembly (6) of the stator (15) serve to center the plate assembly (6) of the stator (15) relative to the shaft (10).

16 Claims, 4 Drawing Sheets

(56) References Cited

FOREIGN PATENT DOCUMENTS

| | | |
|---|---|---|
| DE | 202 02 161 | 4/2002 |
| JP | 2002 058187 | 2/2002 |
| JP | 2006217770 A * | 8/2006 |
| KR | 2019980061803 | 11/1998 |
| RU | 2094927 | 10/1997 |
| RU | 2187189 | 8/2002 |
| RU | 2211516 | 8/2003 |
| SU | 928531 | 5/1982 |

* cited by examiner an electrical machine, in particular an electrical motor comprising a rotor and a shaft. The invention relates specifically to the field of electrical motors for motor vehicles, in particular of electrical motors serving as auxiliary drives for the adjustment by external force of elements of a motor vehicle or for the support of said adjustment.

BACKGROUND

An electrical motor comprising a rotor, a stator and additional components, which are situated in a housing of the electrical motor, are known from the German patent DE 195 23 789 A1. A plurality of stator windings on a stator core is located on said stator. Such a stator core is permanently affixed to the outer circumference of a carrying sleeve and consists of magnetic, respectively magnetizable, material. Furthermore, the rotor is permanently affixed to a shaft of the electrical motor. The control current is directed to the different stator windings on the armature of the stator via a control circuit in such a way that a rotating magnetic field arises in the interior of the motor. Said field then brings the rotor into rotation.

The electrical motor known from the German patent DE 195 23 789 A1 has the disadvantage that the plates and/or the plate assemblies are affixed onto the shaft in a complex way, which requires several job steps.

Rotors can be configured from one or a plurality of plate assemblies or from individual plates and additional components. The plates or plate assemblies are axially positioned onto the shaft, so that lie immediately adjacent to each other.

It is conceivable that the plates and/or plate assemblies could be affixed to the shaft by means of a cylindrical interference fit. In order that the forces do not increase too much when pressing the plate assemblies onto the shaft, the joining parts can have narrow tolerances. This, however, entails high manufacturing costs which are too expensive for many applications. In the case of connections where the joining can solely be produced by an interference fit, grooves result on the shaft and the plate assemblies from the high overlap during fitting. The form and the depth of the grooves have a high variance, whereby errors in the concentricity and an insufficiently large holding force occur in the assembled state. Moreover, these values can vary dramatically.

A solution is furthermore conceivable, wherein recesses or elevations are arranged on the shaft at the joint or the shaft is knurled at the joint. With regard to this solution, additional job steps for applying the recesses or knurling are necessary, and at the same time these methods are limited to a certain installation length. Where knurling is used to solve the task, the concentricity present after installation is not adequate for all applications. Furthermore, the danger exists when producing the recesses or the knurling, in particular in the case of a large length of the plate assemblies, that the shaft becomes uneven.

Solutions are furthermore conceivable, wherein the plates have recesses and/or elevations. When interference-fitting the plate assemblies, which have notched plates, onto the shaft, a fixed connection occurs at the joint location. In these embodiments a large error in the concentricity of a plate assembly, from which the rotor can be configured, to the shaft occurs because the recesses indefinitely deform and as a rule no additional space is present at the joint location, which produces the concentricity of the plate assembly to the shaft.

SUMMARY

The electrical machine according to the invention with the characteristics of claim 1 and the electrical machine according to the invention with the characteristics of claim 14 have in contrast the advantage that an improved mounting of the rotor on the shaft, respectively of the stator in the housing component, is made possible. A relatively cost effective manufacture can be specifically made possible, wherein the desired radial centering of the plate assembly of the rotor, respectively the plate assembly of the stator, to the shaft of the electrical machine is assured.

It is advantageous that the resilient lug is configured nose-shaped. The nose-shaped lug can be bent somewhat during assembly so that a reliable radial centering results, and furthermore a certain preload in a radial direction is thereby made possible.

It is furthermore advantageous that a connection is formed between the shaft and the resilient lug in a positively-locking manner. A nose-shaped lug can be specifically configured in such a way, that a very high surface pressure regionally results when interference-fitting the plate assembly onto the shaft or the plate assembly into the housing component, whereby a notch develops on the shaft and thereby a positively-locking connection regionally occurs in addition to the force fit connection. In so doing, a reliable joining having a correspondingly high connection force is made possible. The connection can then serve to position and to fix.

One or a plurality of lugs are configured in an advantageous manner on a plurality of plates comprising the plate assembly, clearance being provided behind one resilient lug in an axial direction, whereby a certain bending of the resilient lug is made possible during assembly.

The resilient force produced by the resilient lug preferably acts in such a way that the centering lug is impinged in the direction toward the shaft, respectively toward the housing component, in order to ensure a reliable radial centering of the plate assembly relative to the shaft.

It is furthermore advantageous that the centering lug is arranged for clearance fit or for transition fit with the shaft, respectively with the housing component. In so doing, the plate assembly can be simply affixed to the shaft, respectively inserted into the housing component. In the case of a certain, small, positive overlap towards the shaft, respectively towards the housing component, an elastic configuration of the centering lug can also occur in order to simplify the assembly.

It is furthermore advantageous that the shaft is configured stepless at least in one region of the plate assembly, respectively that an interior surface of the housing component is configured stepless at least in one region of the plate assembly. The resilient lugs allow for a force fit connection, if need be also for a positively-locking connection, whereat a lug on the shaft, respectively on housing component, is not required for fixing said shaft in the axial direction. A simplified and consequently cost effective configuration of the shaft, respectively of the housing component, is therefore made possible.

When inserting the plates or plate assemblies into a housing, it can be useful if the housing is provided with groovelike recesses depending on the material and the load on the connection. The clamping noses can then dip into the recesses. This is an advantage when the connection is placed under extreme load.

In an advantageous manner, the resilient lug is configured in such a way that it has a width that decreases in a radial direction. In so doing, the rigidity at the joining location on the shaft decreases inwards and thereby towards the shaft, while the rigidity at the joining location on the housing decreases outwards and thereby towards the housing. The decreasing rigidity can be specifically achieved in a radial direction by means of a configuration of the resilient lug, wherein provision is made for the material thickness to decrease in a radial direction. It is specifically advantageous that a tangential width of the resilient lug decreases in a radial direction. With these measures, the advantage arises in that a load on the resilient lug, in particular stress and strain, which is as even as possible, exists in a radial direction across the expansion of the resilient lug when joining it onto the shaft, respectively into the housing, and in the assembled condition. The load on the resilient lug when viewed point by point is reduced, in particular a narrow radius of curvature, which occurs point by point, is thereby avoided and consequently the dependability of the resilient lug with respect to damage is increased. A uniform curvature of the resilient lug can thereby at least essentially be achieved during the joining operation. The resilient lug is thus essentially uniformly bent in a curved fashion.

A tangential position of a plurality of resilient lugs of a plurality of plates, said lugs being at least essentially arranged in a row, varies in an advantageous manner. In so doing, the resilient lugs stress two or more tracks when being fit onto the shaft, respectively into the housing, so that the danger of a chip formation is greatly reduced. The tangential position of the resilient lugs of the plurality of plates can specifically be so variably configured that (almost) each of the resilient lugs, which are essentially arranged in a row has its own track during joining onto the shaft, respectively into the housing.

In an advantageous manner, a positive fit connection is formed in a circumferential direction between the plate assembly and the shaft. In so doing, a twisting in the circumferential direction, i.e. around an axis of the shaft, is prevented between the plate assembly and the shaft. A reliable connection is thus formed between the plate assembly and the shaft in that direction of the load, which is primarily relevant during operation. It is accordingly advantageous that a positive fit connection is formed in a circumferential direction between the plate assembly of the stator and the housing component.

It is advantageous that the positive fit connection, which is formed in a circumferential direction, is designed between a plate of the plate assembly and the shaft. It is thereby advantageous that the shaft has a recess, in which the resilient lug of the plate of the plate assembly partially engages, so that the positive fit connection is formed in the circumferential direction. This allows for a cost-effective configuration of the positive fit connection. In so doing, provision can be specially made for a plurality of resilient lugs, one or a plurality of resilient lugs engaging in at least one recess of the shaft. The recess in the shaft can be specially formed by means of one groove in the shaft extending in an axial direction. Commensurate advantages also occur in the case of a corresponding configuration of the positive fit connection between the plate assembly of the stator and the housing component.

BRIEF DESCRIPTION OF THE DRAWINGS

Preferred examples of embodiment of the invention are explained in detail in the following description with the aid of the accompanying drawings, in which analogous elements are assigned the same reference numerals. The following are shown.

DETAILED DESCRIPTION

Figure 1:
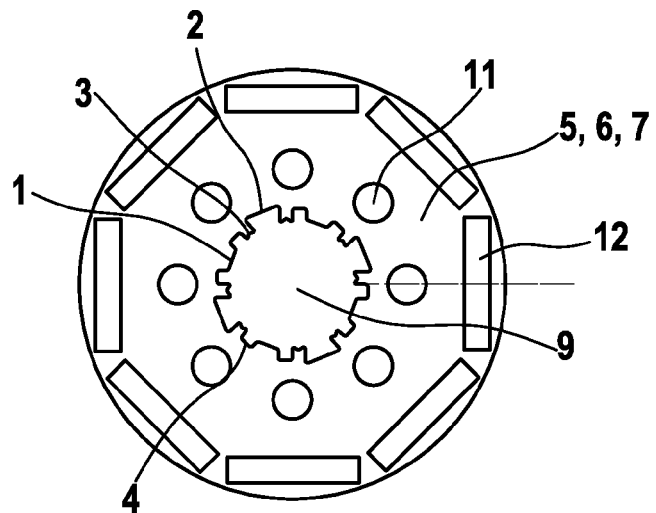
FIG. 1 shows a plate of a plate assembly of a rotor of an electrical machine corresponding to a first example of embodiment of the invention.
Figure 2:
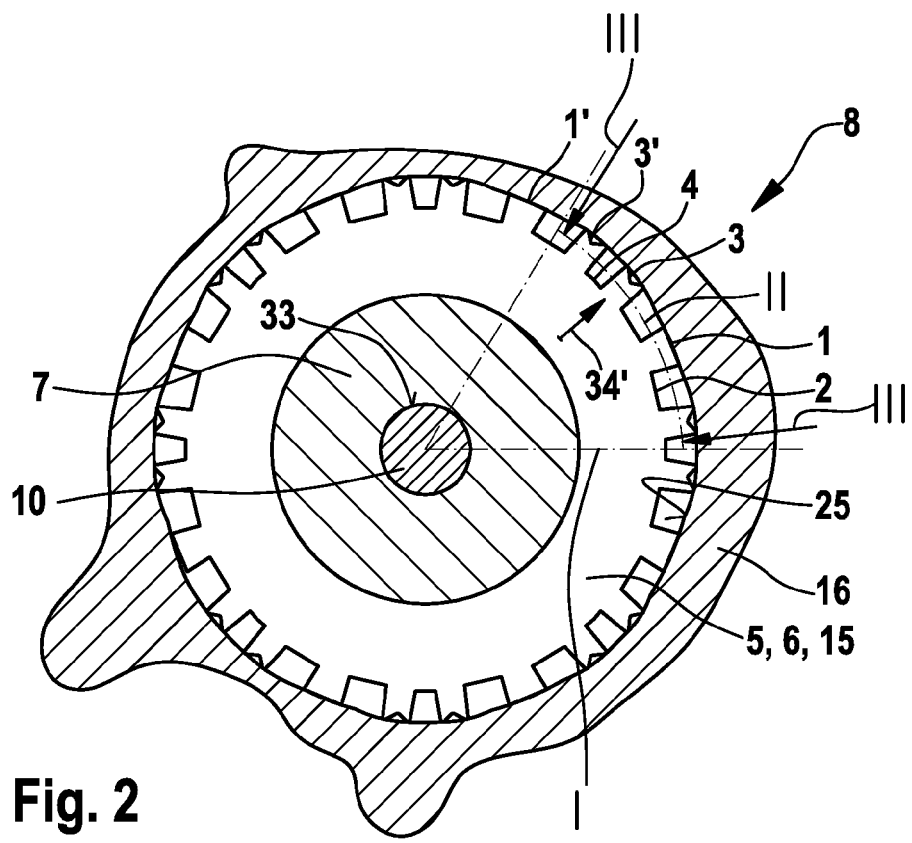
FIG. 2 shows a plate of a plate assembly of a stator together with a housing component of an electrical machine corresponding to a second example of embodiment of the invention.

FIG. 1 shows a plate 5 of a plate assembly 6 of a rotor 7 of an electrical machine 8 (FIG. 2). The electrical machine 8 can be configured in particular as an electrical motor for a motor vehicle. The electrical machine 8 is specially suited for the adjustment by external force of elements of a motor vehicle, for example the sun roof, a window or a seat adjustment mechanism. The electrical machine 8 can furthermore serve as an electrical motor for driving a steering booster. The electrical machine 8 is, however, also suited for other cases of application.

Figure 3:
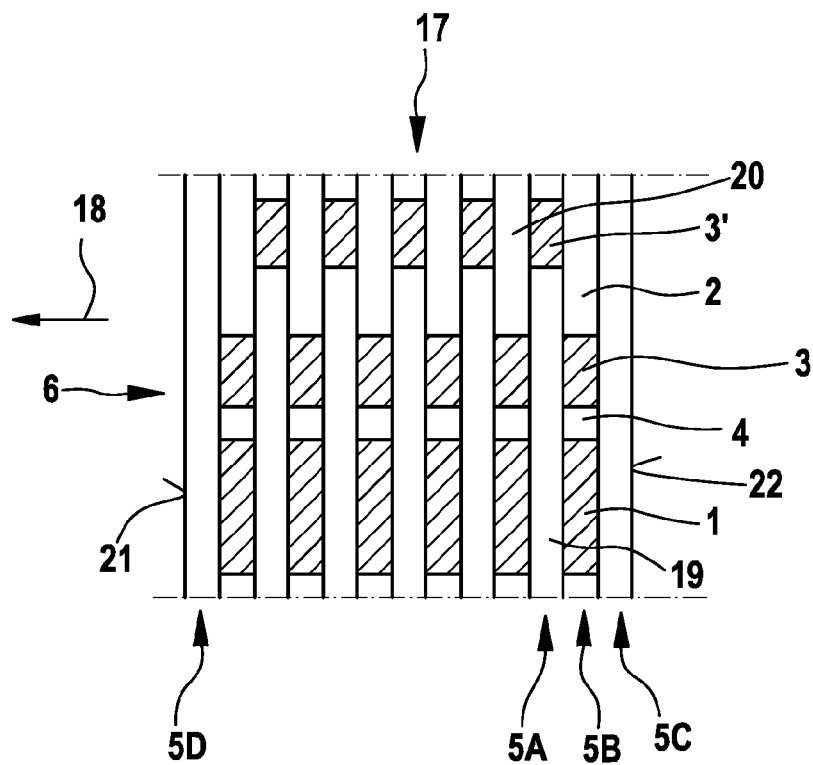
FIG. 3 is a simplified depiction of selected parts of a sectional view through a plate assembly corresponding to a third example of embodiment for additional explanation of the invention.

The plate 5 of the plate assembly 6 of the rotor 7 has a centering lug 1, which allows for a concentric mounting of a shaft, which can be inserted into a concentric recess 9 of the plate 5. Furthermore, the plate 5 has a resilient lug 3, which is configured nose-shaped. The resilient lug 3 allows for a fixing of individual plates 5 or of plate assemblies 6 on a shaft 10 (FIG. 2) by means of the plate 5. The plate 5 has additional centering lugs 1, which for the sake of simplifying the depiction are not separately labeled. The plate 5 has furthermore additional resilient lugs, which are likewise not labeled. In the example of embodiment depicted in FIG. 1, the plate 5 has centering lugs 1 as well as resilient lugs 3. A plate assembly 6 comprises a plurality of plates 5 as is depicted in FIG. 3. It is also possible for one of the plates 5 to have at least one centering lug while another one of the plates 5 has at least one resilient lug 3. The plate 5 has recesses 2, 4 in the region of the concentric recess 9. The recesses 2, 4 serve on the one hand the purpose of providing a nose-shaped configuration of the resilient lug. On the other hand, the recesses 2, 4 are arranged in such a way that a clearance is created behind one resilient lug 3 and/or a centering lug 1 in the case of a stacking of the plate assembly 6 with a plurality of plates 5. Consecutive plates 5 are thereby in each case layered on top of each other in a twisted fashion. As a result when inserting the shaft 10 into the concentric recess 9, a springing-in of the resilient lug 3 and/or the centering lug 1 is made possible. The rigidity of the resilient lugs 3 and/or the rigidity of the centering lugs 1 can be predefined by means of the depth of the recesses 2, 4 which are configured groovelike. The centering lugs 1 can be configured in such a way that a clearance, transition or interference fit occurs in relation to the shaft 10. In this connection, provision can be made for a certain positive overlap towards the shaft 10, an at least partially elastic configuration of the centering lug 1 being advantageous. The centering lugs 1 with positive overlap towards the shaft 10 are usually laid out as a clearance fit.

The resilient lugs 3 can be structured in such a way that a high surface pressure regionally occurs when joining the plates 5 and/or the plate assemblies onto the shaft 10. Furthermore, a positive fit connection regionally develops in addition to the force fit connection. The shaft 10 can thereby be configured stepless at least in the region of the plate assembly 6.

The advantage results from the centering lugs 1 in that a concentricity of the plates 5 and/or the plate assemblies 6 towards the shaft 10 can be achieved with narrow tolerances. A cost-effective manufacture of the electrical machine is thereby possible because the plate assembly 6 does not have to be reworked. Furthermore, a tolerance for the diameter of the shaft 10 can be expanded because a balance is created by the resilient lugs 3 and if need be by the centering lugs 1. Relatively long plate assemblies 6 can be mounted on the shaft 10 by configuring a larger number of the plates 5 of a plate assembly 6 with resilient lugs 3 and/or centering lugs 1.

In addition the plate 5 has recesses 11, only the notch 11 in FIG. 1 being labeled. The recesses serve to reduce the mass of the rotor 7 and are used during assembly. Furthermore, the plate 5 has slot-shaped recesses 12, of which the recess 12 is labeled in FIG. 1. The slot-shaped recesses 12 of the stacked plates 5 lie behind each other in a way that they allow for the mounting of permanent magnets.

FIG. 2 shows a plate 5 of a plate assembly 6 of a stator 15 together with a housing component 16 of an electrical machine 8 corresponding to a second example of embodiment of the invention. The configuration depicted in FIG. 2 can be combined with a rotor 7, which is configured according to the example of embodiment depicted with the aid of FIG. 1.

The plate 5 has centering lugs 1, 1', between which one, two or a plurality of resilient lugs 3, 3' is (are) respectively arranged. Recesses 2, 4 are thereby provided in order to form the resilient lugs 3, 3' and the centering lugs 1, 1'. The centering lugs 1, 1' permit a centering of the stator 15 in relation to the shaft 10 in order to establish the position of the stator 15 in relation to the rotor 7.

The stator 15 has a plate assembly 6 constituted by a plurality of plates, windings and if need be additional components. In order to simplify the depiction, the plate 5 is depicted in FIG. 2 without these additional components. The connection of the plate assembly 6 to the housing component 16 results via the resilient lugs 3, 3', the centering lugs 1, 1' ensuring the positioning and centering. The centering lugs 1, 1' compensate here in particular for varied deformations of the resilient lugs 3, 3' across the circumference of the plate 5, which otherwise could occur on account of manufacturing tolerances and the like. An essentially uniform deformation of the resilient lugs 3, 3' therefore results by means of the centering lugs 1, 1', whereby the clamping force of the stator 15 in the housing component 16 is improved.

This configuration has the advantage that the concentricity of the plate assembly 6 to the shaft 10 and to the housing component 16 can be maintained with a high degree of accuracy and/or with relatively low costs. Due to the uniform deformation of the resilient lugs 3, 3', which is ensured by the centering lugs 1, 1', it is assured that all of the resilient lugs 3, 3' deform and contribute to the clamping effect so that a large clamping force is achieved. The assembly is furthermore simplified in particular because additional fixing devices for fixing or positioning can be omitted.

The housing component 16 can at least essentially form the housing of the electrical machine 8 or constitute a part of the housing of the electrical machine 8. It is also thereby possible for the housing component 16 itself to be composed of a plurality of parts.

FIG. 3 shows the cut-out of a sectional drawing labeled in FIG. 2 with I along the line of intersection labeled with II through the plate assembly 6 from the viewing direction labeled with III corresponding to a third example of the invention. The plate assembly 6 of this example of embodiment has a middle section 17, which is configured from a plurality of plates 5. Provision is thereby made for two types of plates 5, namely plates 5A and plates 5B, which are stacked alternately back-to-back. Furthermore, provision is made for end plates 5C and 5D to be attached to the middle section 17; and in so doing, provision can be made for no or a plurality of end plates 5C and 5D on each end of the plate assembly 6. The plate 5A is configured in such a way that a clearance 19 is provided in an axial direction 18 behind the centering lug 1 of the plate 5B as well as behind the resilient lug 3. Said clearance 19 permits a springing-in of the resilient lug 3 and if need be the centering lug 1 when mounting the plate assembly 6 on the shaft 10. One of the plates 5B is accordingly configured in such a way that a clearance 20 is provided behind the resilient lug 3' in the axial direction 18.

When joining the plate assembly 6 onto the shaft 10, respectively into the housing component 16, the resilient lugs 3, 3' are deformed, in particular bent in an axial direction 18. After bending, the resilient lugs 3 as well as the resilient lugs 3' then protrude beyond the plates 5B, respectively 5A. In order that an end face 21 of the plate assembly 6 can be configured as a stop for another component, for example a spring or an additional plate assembly, the end face 21 is formed by the end plate 5D, which does not have any resilient lugs 3, 3' nor any centering lugs 1, 1'. In a corresponding manner, an end face 22 is formed by an end plate 5C. Provision can also be made at the respective end of the plate assembly 6 for no or two or more end plates 5C, 5D. Furthermore, it is also possible that within the plate assembly corresponding plates are provided to the end plates 5C and 5D in order to create the clearance 2 and/or the clearance 4 and/or the clearance 19 and/or the clearance 20. In the example of embodiment depicted, a clearance 19, 20 is provided behind a resilient lug 3, 3'. Especially in the case of thin plates 5A, 5B, which can be manufactured from thin sheet metal sheets, or in the event that a rather rigid, in particular very rigid connection is required, two or more resilient lugs 3, 3' can also lie one behind the other in an axial direction so that in each case a clearance 19, 20 follows after two or more resilient lugs 3, 3' lying one behind the other.

During the manufacture of the plates 5, a slide or a single punch can be provided in the stamping machine for the production of the resilient lugs 3, 3'. Said slide or single punch is automatically adjusted and in fact in such a way that plates 5 with and without resilient lugs 3, 3' can be produced in the required sequence as is required for stacking the plate assembly 6.

The construction of the plate assembly 6 illustrated in FIG. 3 is also possible in a corresponding manner in the case of the plate assembly 6 of the rotor 7, which is depicted in FIG. 1.

In the first example of embodiment described with the aid of FIG. 1, the advantage is that the shaft 10 does not have any or has a reduced number of steps. In the second example of embodiment described with the aid of FIG. 2, the advantage is that an inside surface 25 of the housing component 16 can be configured stepless at least in a region of the plate assembly 6. The resilient lugs 3 can thereby enter not only into a force fit connection but also into a positive fit connection in the region of the interior surface 25 of the housing component 16.

Figure 4:
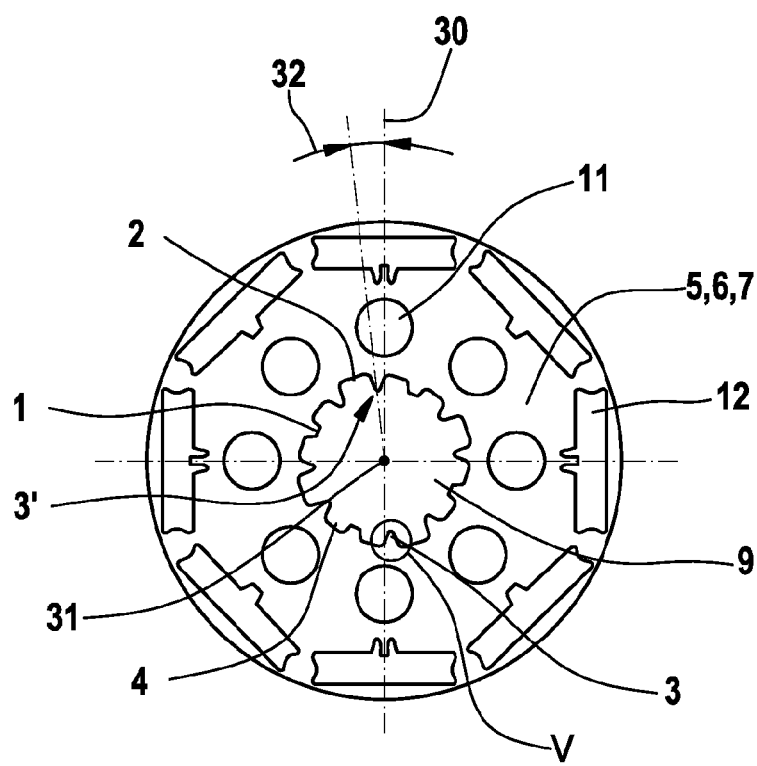
FIG. 4 shows a plate of a plate assembly of a rotor of an electrical machine corresponding to a fourth example of embodiment of the invention.

FIG. 4 shows a plate of a plate assembly 6 of an electrical machine 8 according to a fourth example of embodiment of the invention. A plurality of resilient lugs 3, 3' are thereby depicted. In order to simplify the depiction, only the resilient lugs 3, 3' are labeled. The configuration of the resilient lugs 3, 3' is further described in detail with the aid of FIGS. 5 and 6. Furthermore, an advantageous arrangement in relation to the shaft 10 is provided for the resilient lugs 3, 3'. This arrangement is further explained in detail for the resilient lug 3'. A reference direction is to be predefined for the plate 5. The reference direction 30 is in this case defined by the center 31 of the plate 5 and a recess 11 of the plate. The reference direction 30 can, however, also be defined in another way. The reference direction 30 is thereby also defined for other plates. An angular position 32 of the resilient lug 3' is also specified in relation to the reference direction 30. The tangential position of resilient lugs 3', which are arranged at least essentially one behind the other, can be varied by a certain variation of the angular position 32 of the resilient lugs 3' of a plurality of plates 5 of a plate assembly 6. For example, the angular position 32 of resilient lugs, which are arranged essentially one behind the other, of a plurality of plates can vary by several angular degrees. This has the advantage that varied tracks result on the surface 33 (FIG. 6) of the shaft 10 when joining said assembly to the shaft 10. As a result, the danger of a chip formation when joining the plate 5, respectively the plate assembly 6, onto the shaft 10 is reduced.

Figure 5:
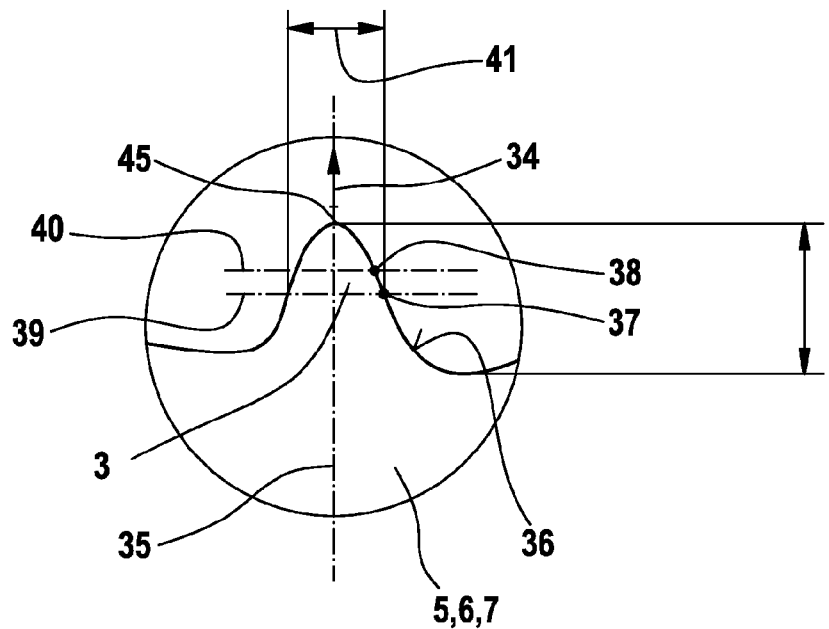
FIG. 5 shows the cut-out labeled in FIG. 4 with V of a plate of a plate assembly of a rotor of an electrical machine corresponding to the fourth example of embodiment of the invention.

FIG. 5 shows the cut-out of a plate 5 of a plate assembly 6 of a rotor 7, which is labeled in FIG. 4 with V, in the fourth example of embodiment of the invention, the configuration of the resilient lug 3 being shown in further detail. The additional resilient lugs of the plate 5 and of the other plates of the plate assembly 6 can be configured in a corresponding manner. A radial direction 34 is specified in relation to the resilient lug 3, which points to the center 31 of the plate 5. The radial direction 34 lies thereby at least substantially on an axis of symmetry 35 of the resilient lug 3, which is regionally specified for the resilient lug 3. The resilient lug 3 is thereby configured at least approximately symmetrical to the axis of symmetry 35. The points 37, 38 are selected by way of example in FIG. 5 on a flank 36 of the resilient lug 3, the point 38 following the point 37 on the flank in the radial direction which is directed towards the inside. Cross-sections 39, 40 through the resilient lug 3 are defined by the points 37, 38, the cross-sectional surfaces 39, 40 being oriented in each case vertically to the axis of symmetry 35. The resilient lug 3 has a certain tangential width 41 in relation to the cross section 40. The resilient lug 3 of the plate 5 of the fourth example of embodiment tapers towards the inside in the radial direction 34. In so doing, the tangential width 41 decreases from the cross-section 39, which is defined by the point 37, to the cross-section 40, which is defined by the point 38. The reduction in this cross-sectional surface is achieved in this example by reducing the tangential width 41; and in so doing, the thickness of the resilient lug 3 can, however, also decrease. The material thickness of the resilient lug 3 thereby continually reduces in the radial direction. As a result, a decline in rigidity of the resilient lug 3 is achieved in the radial direction 34 directed towards the inside.

Furthermore the resilient lug 3 has only one head point 45. The head point 45 is thereby the point of the resilient lug 3, which slides along the surface 33 when being fit onto the shaft 10. It is therefore also possible that the resilient lug 3 is configured somewhat flattened in the region of the head point 45.

Figure 6:
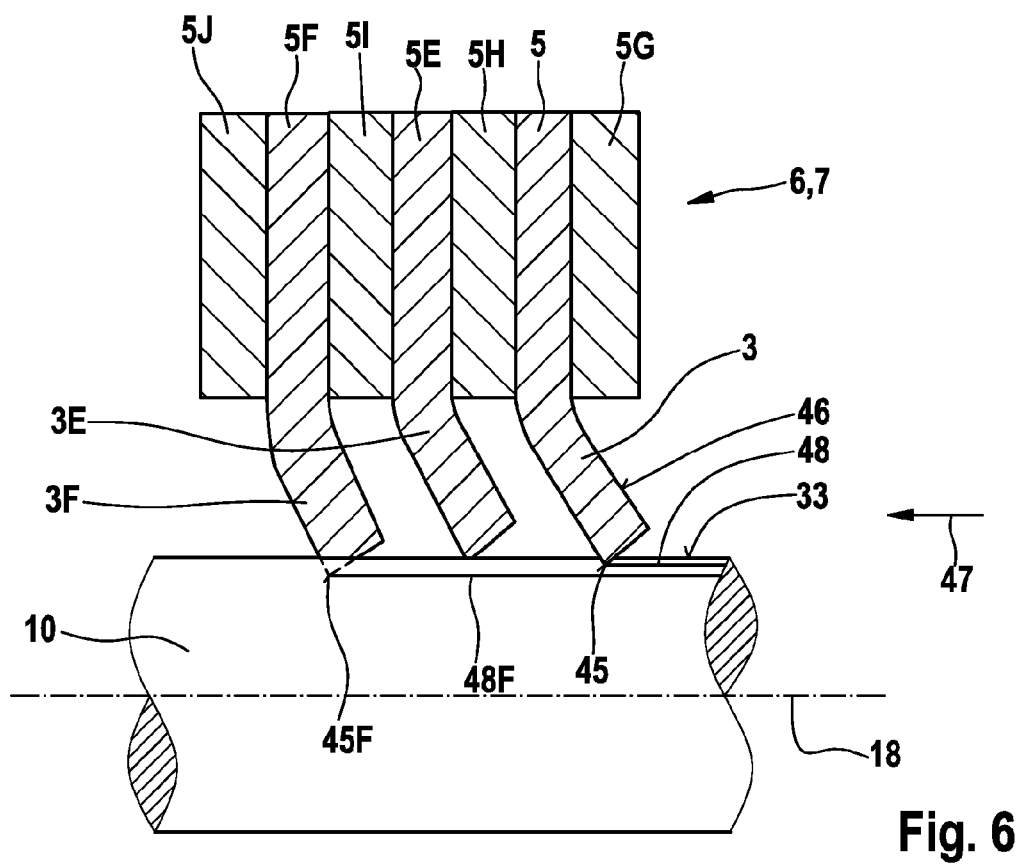
FIG. 6 is a schematic depiction of selected parts of a sectional view through a plate assembly, which has been fit onto a shaft, according to the fourth example of embodiment of the invention.

FIG. 6 shows a schematic sectional view of selected parts through a plate assembly 6, which has been joined onto a shaft 10, of the fourth example of embodiment of the invention. In addition to plate 5, the plates 5E, 5F, 5G, 5H, 5I, 5J are also thereby shown. The plate assembly 6 can, however, also have another number of plates 5, 5E to 5J, in particular a significantly larger number of plates. The plate 5 has the resilient lug 3, which is essentially uniformly bent in a curved fashion towards the shaft 10; and in so doing, the resilient lug 3 has a concavely curved end face 46 which is oriented against the assembly direction 47. A head point 45 of the resilient lug 3 is thereby in contact with the surface 33 of the shaft 10. The plates 5E, 5F have resilient lugs 3E, 3F, which corresponding to the resilient lug 3 are essentially uniformly bent in a curved fashion towards the shaft 10.

The tangential position of the resilient lugs 3, 3E, 3F, which are essentially arranged one behind the other, admittedly varies, which is achieved by a variation of the respective angular position 32 of the resilient lugs 3, 3E, 3F as is described in detail with the aid of FIG. 4. A head point 45F of the resilient lug 3F of the plate 5F at another circumferential position is thereby led across the surface 33 of the shaft 10. A track 48F of the resilient lug 3F arises when the plate assembly 6 is joined onto the shaft 10, which is different from a track 48 of the resilient lug 3. The head point of the resilient lug 3E and the corresponding track are concealed in FIG. 6 by the shaft 10. The resilient lugs 3, 3E, 3F consequently have in each case their own track during joining onto the shaft 10 so that the danger of chip formation is minimized.

The configuration of the plate 5, which is described with the aid of FIGS. 4 and 6, in particular of the resilient lug 3 as well as of additional plates 5E, 5F can in a corresponding manner be applied to the joint location between the plate assembly 6 and the housing component 16 of the electrical machine 1. For instance, the one radial direction 34' which is directed towards the outside, can be predefined in relation to the resilient lug 3 that is depicted in FIG. 2. The resilient lug 3, which is depicted in FIG. 2, can then be configured according to the fourth example of embodiment. In this case, the resilient lug 3 has a decline in rigidity in the radial direction 34' which is directed towards the outside. This can be achieved by the resilient lug 3 having a piecewise decreasing material thickness in the radial direction which is directed towards the outside, in particular by the resilient lug 3 having a decreasing tangential width 41 in the radial direction 34' which is directed towards the outside. This has the advantage that the resilient lug 3 is at least essentially uniformly bent in a curved fashion towards the housing component 16. It is thereby further advantageous that a tangential position of resilient lugs of a plurality of plates, which are arranged essentially one behind the other, varies so that different tracks of the resilient lugs of a plurality of plates vary, so that different tracks of the resilient lugs develop on the interior surface 25 of the housing component 16 during joining and so that the danger of a chip formation is minimized.

Figure 7:
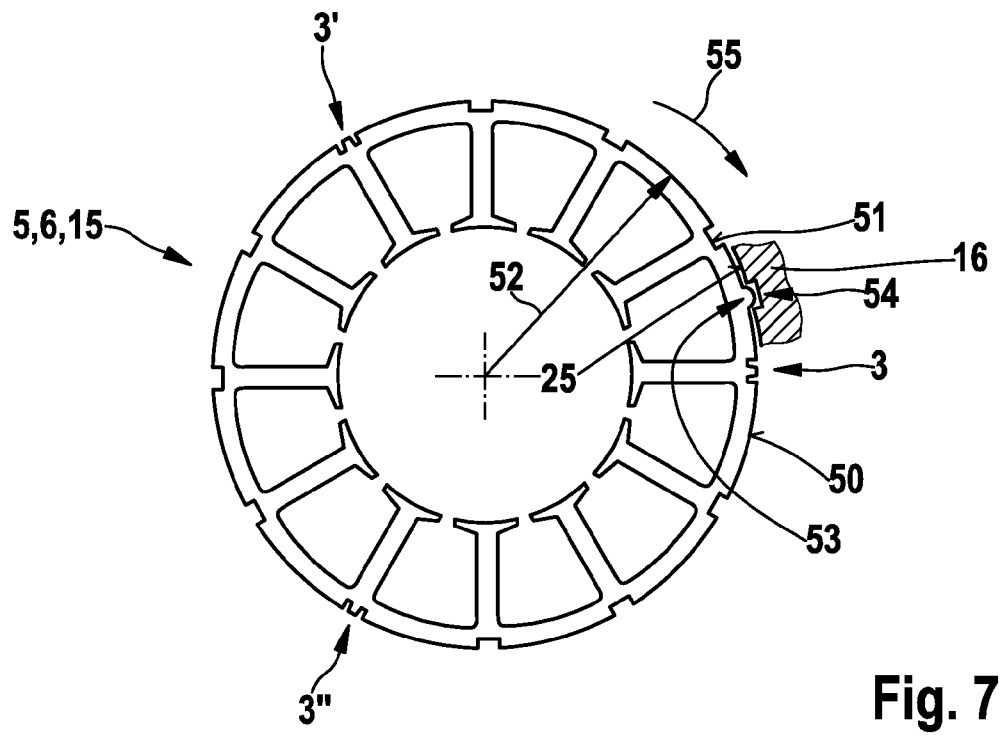
FIG. 7 shows a plate of a plate assembly of a stator of an electrical machine according to a fifth example of embodiment of the invention and FIG. 8 shows a stator with a housing component of an electrical machine according to a sixth example of embodiment of the invention.

FIG. 7 shows a plate 5 of a plate assembly 6 of a stator 15 of an electrical machine 8 according to a fifth example of embodiment of the invention.

Stators, in particular from EC internal rotor motors, can be mounted on a surrounding housing component 16 in a manner which is radially resistant to torsion and axially resistant to displacement by means of various methods. In so doing, glues, a mechanical press-in operation with allowance for clearance, fastening using tensioning bolts, assembly by means of press fit spring pins in the gap between the stator 15 and the housing component 16 as well as thermal shrinking are worthy of consideration. These joining techniques for the axial and radial fixing of the stator 15 in the housing component 16, which can be constituted by an aluminum profile or a die cast aluminum housing, can be replaced by the connection according to the invention. Aluminum is a possible material. Further possible materials are steels and plastics. In so doing, the advantage is that no accessory parts are necessary and that a process-sure dimensional accuracy of the final component assembly can be specified. Furthermore, scrapings, in particular chips, which develop during a mechanical press-in operation with allowance for interference, are reduced or prevented. Accessory parts like glues, screws, dowel pins are also not required. The robustness of the manufacturing process of the connection of the stator 15 to the housing component 16 is consequently increased. Moreover, savings in costs without risking quality can be achieved in the manufacturing process.

The method for fixing the stator 15 of the electrical machine 8 in the housing component 16 can be achieved by means of integrally formed geometry elements on the circumference of the stator, which become barbs as a result of the assembly of the final product. The solution described below for fixing the stator 15 in the housing component 16 can in a corresponding manner be transferred to the fixing of the rotor 7 on the shaft 10.

The advantage specifically with regard to the fifth example of embodiment is that the robustness of the manufacturing process of the connection between the stator 15 and the housing component 16 is increased. This increase develops on account of the lack of accessory parts and additional manufacturing steps, on account of a slight reduction if necessary of the sensitivity to dimensional tolerances between the stator 15 and the housing component 16 and on account of the possibility of reducing the quality of the housing surfaces. Said reduction is by virtue of the fact that the capability exists to a certain extent to permanently compensate for tolerances, rougher surfaces benefiting the holding forces of the connection. Moreover, the advantage is that costs can be saved in the manufacturing process. One such cost savings results from relatively simple equipment because only a press with force/stroke monitoring is required. Another such savings results from dispensing with the handling of additional parts with all of the associated consequences such as, for example, parts management, storing and inquiry about available parts. There is furthermore the advantage of a simple manufacturability and a simple processability of a connection, which is unreleaseable, compensates for tolerances and is if need be conditionally resistant to torsion. Said connection can also be used on both sides, i.e. independent of the axial direction. These advantages also occur in particular in the case of the example of embodiment described with the aid of FIG. 8.

In the case of the plate 5 of the fifth example of embodiment of the invention, which is depicted in FIG. 7, a circumferential contour 50 of the plate 5 is formed by stamping or the like, which deviates from a circular form. In so doing, resilient lugs 3, 3', 3" are provided, which are in each case angularly spaced apart by 120 E. Furthermore, recesses 51 are provided, of which the recess 51 is labeled in FIG. 7. The recesses 51 are thereby set back in relation to a radius 52 of the plate 5. The resilient lugs 3, 3', 3" additionally extend at least approximately up to the radius 52. It is advantageous that the resilient lugs 3, 3', 3" protrude over the radius 52 of the plate 5 so that in the case of a housing component 16 with a fully cylindrical contour of the interior surface 25 (FIG. 2), a bending of the resilient lugs 3, 3', 3" is achieved during joining. The manufacture of the housing component 16 is thereby simplified. The resilient lugs 3, 3', 3" can, however, also be run up to the radius or even undershoot said radius. This involves, however, a complement part, i.e. in this instance an interior wall 25 of the housing component 16, with a non-fully cylindrical contour. This non-fully cylindrical contour can thereby be configured in such a way that it is run up to the radius 52 or into this area at least in the region of the resilient lugs 3, 3', 3". In so doing, a reliable joint by means of the springing-in of the resilient lugs 3, 3', 3" is achieved during joining.

The circumferential contour 50 must not inevitably arise from a circular form. The circumferential contour 50 can emanate from a polygonally shaped contour, which can be modified according to the configuration shown in FIG. 7 by provision being made for recesses 51 and resilient lugs 3, 3', 3". In this instance it is very important that the circumferential contour 50 is configured in the region of the resilient lugs 3, 3', 3", i.e in the region of the contact with the interior surface 25 of the housing component 16, in such a way that an allowance for interference exists in combination with this interior surface 25 in order to allow for the operation of the resilient lugs 3, 3', 3". A slight air crevice can incidentally be situated between the plate assembly 6 of the stator 15 and the interior wall 25 of the housing component. No contact between a plate and the housing component 16 is desirable within the two regions.

Moreover, the plate 5 shown in FIG. 7 of the fifth example of embodiment of the invention has at least one projection 53 with a semicircular shaped contour. The projection 53 protrudes thereby clearly beyond the radius 52. The projection 53 particularly protrudes beyond the radius 53 significantly further than the resilient lugs 3, 3', 3". A form-fit connection can be formed in a circumferential direction 55 with the housing component 16 by means of the projection 53 of the plate 5. The projection 53 thereby engages with a recess 54 in the interior surface 25 of the housing component 16, said recess 54 being formed by a groove running in an axial direction. When joining the stator 15 into the housing component 16, the projection 53 is positioned in relation to the recess 54.

A projection 53 is depicted in FIG. 7. A plurality of projections 53, which are configured according to the projection 53 can, however, often be provided on the circumferential contour 50. The angular distance between such projections can be selected in relation to the respective application. A rotation of the stator 15 relative to the housing component 16 in the circumferential direction can be totally prevented by the projection 53.

Figure 8:
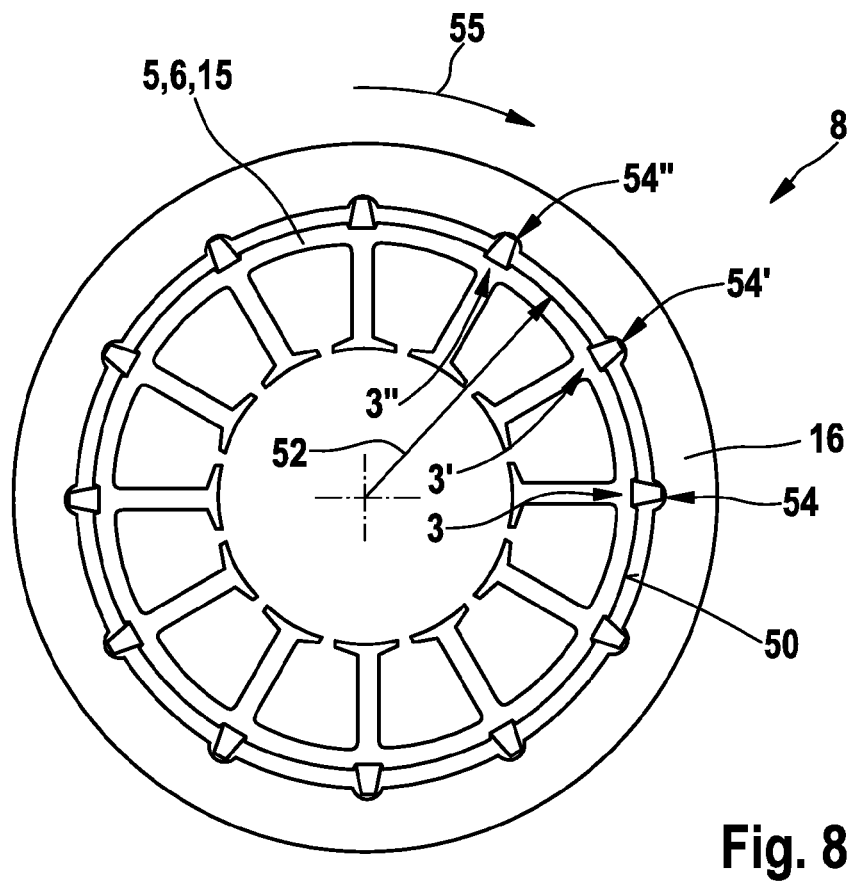

FIG. 8 shows a plate 5 of a plate assembly 6 of a stator 15 with a housing component 16 of an electrical machine 8 according to a sixth example of embodiment of the invention. In this example of embodiment, the plate 5 has a plurality of resilient lugs 3, 3', 3". For the sake of simplifying the depiction, only the resilient lugs 3, 3', 3" are labeled. Furthermore, the housing component 16 has a plurality of recesses 54, 54', 54" on the interior surface 25, of which only the recesses 54, 54', 54" are labeled in FIG. 8. In this example of embodiment, the resilient lugs 3, 3', 3" as well as the recesses 54, 54', 54" are thereby repetitively arranged in the circumferential direction 55 on the plate 5, respectively on the housing component 16. A positioning is thus simplified when joining the stator 15 into the housing component 16. A certain position of the stator 15 in relation to the housing component 16 can inversely also be predefined in the circumferential direction by an asymmetrical arrangement.

The resilient lug 3 engages with the recess 54 during joining; and in so doing, the resilient lug 3 conspicuously protrudes beyond the radius 52 and is bent inside of the recess during joining. The same is true for the resilient lug 3' and the recess 54' as well as the resilient lug 3" and the recess 54". The recesses 54, 54', 54" can thereby be configured groovelike, the respective groove extending in an axial direction.

It should be noted that after joining operations, a force acting in an axial direction against the direction of pressing-in causes the resilient lugs 3, 3', 3" to grip in the respective recess 54, 54', 54", a regional micro-positive fit being formed. Therefore, the resilient lugs 3, 3', 3" can bury themselves in the interior surface 25 in the region of the recesses 54, 54', 54".

A positive fit, which allows for a total lock against rotation, is therefore also ensured in the circumferential direction 55 by means of the resilient lugs 3, 3', 3" engaging with recesses 54, 54', 54". A reliable fixing of the stator 15 in the housing component 16 is consequently achieved directly in the main direction of the load, i.e. in the circumferential direction 55.

During assembly the stator 15 can be inserted into the housing component 16 using a press. The respective allowance for interference, which was previously described, between the resilient lug 3, 3', 3" and the associated recess 54, 54', 54" in the interior surface 25 of the housing component 16 forces the resilient lugs 3, 3', 3" to definably deform in the region of contact. In so doing, a plastic part and a permanently elastic residue remain. The bending can be simplified by a bevel in the insertion region. The stator 15 is permanently secured in the housing component 16 by means of a suitable layout of the resulting installation angle of the resilient lugs 3, 3', 3". In order to promote a defined deformation of the resilient lugs 3, 3', 3", provision is made for said lugs 3, 3', 3" to be in certain distances to the plates of the plate assembly 6 when viewed axially.

This spacing of the resilient lugs prevents them from abutting against one another as is described in detail with the aid of the FIGS. 3 and 6. Otherwise the danger would exist that the joining forces increase in an unfavorably substantial manner and the individual plates of a plate assembly 6 separate from each other and the stator 15 breaks down into its component parts.

It should be noted that the configuration of the connection between the stator 15 and the housing component 16, which is described with the aid of the FIGS. 7 and 8, can be applied in a corresponding manner to the connection between a rotor 7 and a shaft 10 of the electrical machine 8.

The invention is not limited to the examples of embodiment described.

The invention claimed is:

1. An electrical machine comprising a rotor and a shaft, the rotor comprising a plurality of plates, wherein the plates are premounted on the shaft by a joining operation as one of individually, a plate assembly, and a plurality of plate assemblies, and wherein the plates and plate assemblies are at least indirectly connected to the shaft, comprising:
a resilient lug configured for each plate assembly on at least one plate to at least indirectly fix the plate assembly to the shaft, the resilient lug for each plate configured to have a substantially uniform deformation relative to the resilient lug for other plates; and
a centering lug configured on at least one plate and at least one additional plate to at least substantially radially center the plate assembly relative to the shaft, wherein substantially radially centering the plate assembly relative to the shaft results in the substantially uniform deformation of the resilient lug for each plate, wherein if the rotor is constructed from a plurality of individual plates, each individual plate has at least one resilient lug and at least two centering lugs arranged radially oppositely to each other.

2. The electrical machine of claim 1, wherein the resilient lug is configured nose-shaped.

3. The electrical machine of claim 1, wherein the resilient lug is preloaded at least in a radial direction and the individual plates and plate assemblies are thereby fixed on the shaft in a force-fitting manner.

4. The electrical machine of claim 3, wherein a positive fit connection is formed between the shaft and the resilient lug.

5. The electrical machine of claim 1, wherein resilient lugs are configured on a plurality of plates of the plate assembly and a clearance is provided at least in a radial direction behind one resilient lug.

6. The electrical machine of claim 1, wherein the centering lug is configured with at least one of a clearance and a transition fit towards the shaft.

7. The electrical machine of claim 1, wherein the centering lug is configured with a positive overlap towards the shaft and in that the centering lug is configured to be at least partially elastically deformed.

8. The electrical machine of claim 1, wherein the shaft is configured stepless at least in a region of the plate assembly.

9. The electrical machine of claim 1, wherein the resilient lug comprises a decline in rigidity in a radial direction that is inwardly directed.

10. The electrical machine of claim 9, wherein the resilient lug comprises a decreasing tangential width in the radial direction that is inwardly directed.

11. The electrical machine of claim 9, wherein the resilient lug is essentially uniformly bent in a curve towards the shaft.

12. The electrical machine of claim 1, wherein a tangential position of resilient lugs that are at least essentially arranged one behind the other of the plurality of plates varies.

13. The electrical machine of claim 1, wherein a positive fit connection is formed between a plate assembly and the shaft in a circumferential direction.

14. The electrical machine of claim 13, wherein the positive fit connection is formed between a plate of the plate assembly and the shaft.

15. The electrical machine of claim 1, wherein the shaft comprises at least one recess and in that the resilient lug of the plate of the plate assembly at least partially engages the recess of the shaft to form a positive fit connection in a circumferential direction.

16. The electrical machine of claim 15, wherein the recess is formed by a groove in the shaft and running in an axial direction.

* * * * *